United States Patent

[11] 3,615,995

[72] Inventors Robert R. Buntin;
 John W. Harding; James P. Keller; Vollie L. Murdock, all of Baytown, Tex.
[21] Appl. No. 752,592
[22] Filed Aug. 14, 1968
[45] Patented Oct. 26, 1971
[73] Assignee Esso Research and Engineering Company

[54] METHOD FOR PRODUCING A MELT BLOWN ROVING
 13 Claims, 6 Drawing Figs.

[52] U.S. Cl.................................................. 156/161, 156/167, 156/180
[51] Int. Cl..................................................... B65h 51/00
[50] Field of Search........................................... 156/161, 167, 180

[56] References Cited
UNITED STATES PATENTS
2,736,676 2/1956 Frickert....................... 156/167 X
3,433,857 3/1969 Dutton et al................. 156/167 X
3,439,085 4/1969 Hartmann .................... 156/167 X Primary Examiner—Benjamin R. Padgett
Assistant Examiner—R. L. Tate
Attorneys—Thomas B. McCulloch, Melvin F. Fincke, John B. Davidson, John S. Schneider, Sylvester W. Brock, Jr. and Kurt S. Myers ABSTRACT: A roving of entangled and self-bonded fine fibers of thermoplastic resins may be formed by a melt blown roving technique which comprises extruding the thermoplastic resin through a die having the die openings in a circle into a hot gas stream to attenuate the extruded polymer into fibers in the form of a cone of fibers in space and collecting the fibers as a tow. The process yields many unique products which vary in characteristics depending on the specific collection of the fibers.

PATENTED OCT 26 1971

INVENTORS.
ROBERT R. BUNTIN,
JOHN W. HARDING,
JAMES P. KELLER,
VOLLIE L. MURDOCK,

BY Kurt S. Myers.
ATTORNEY.

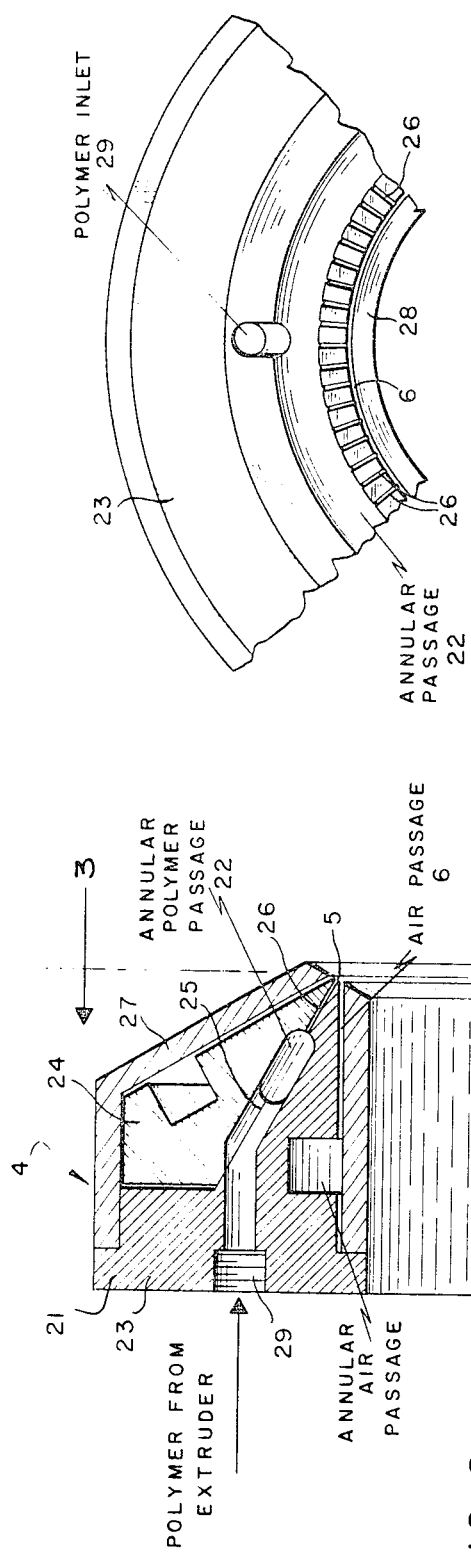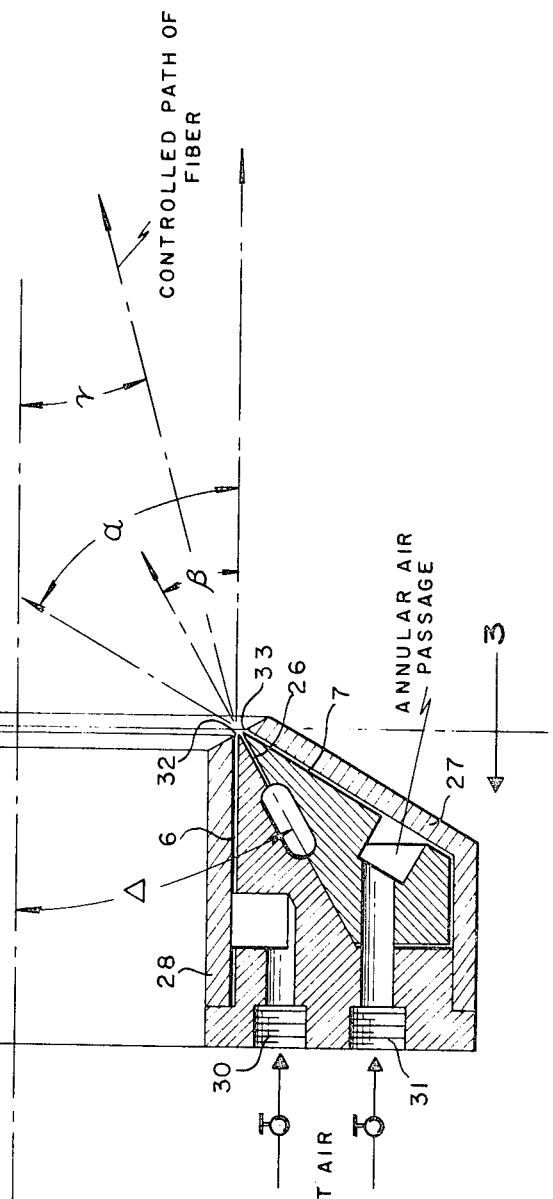

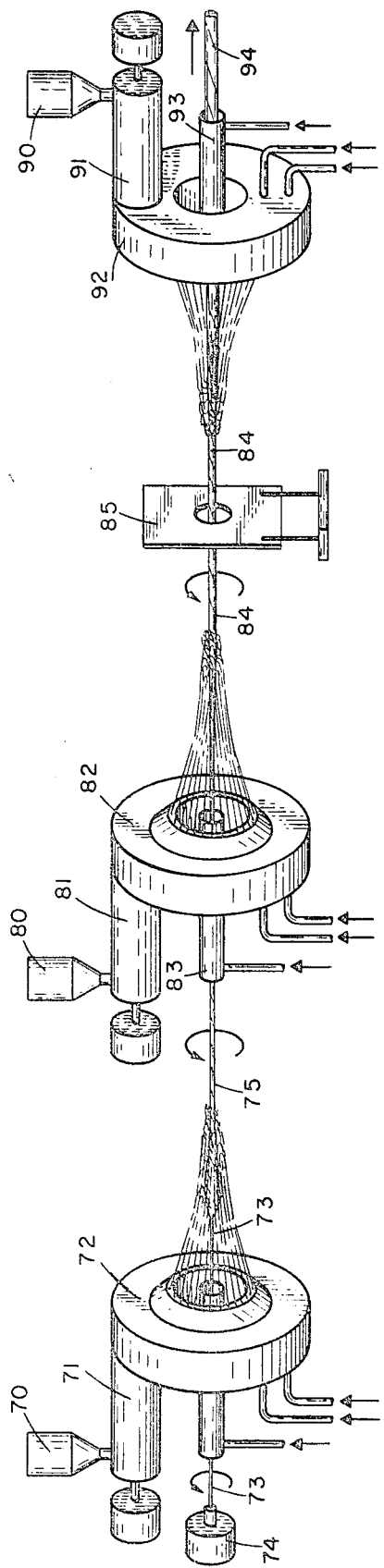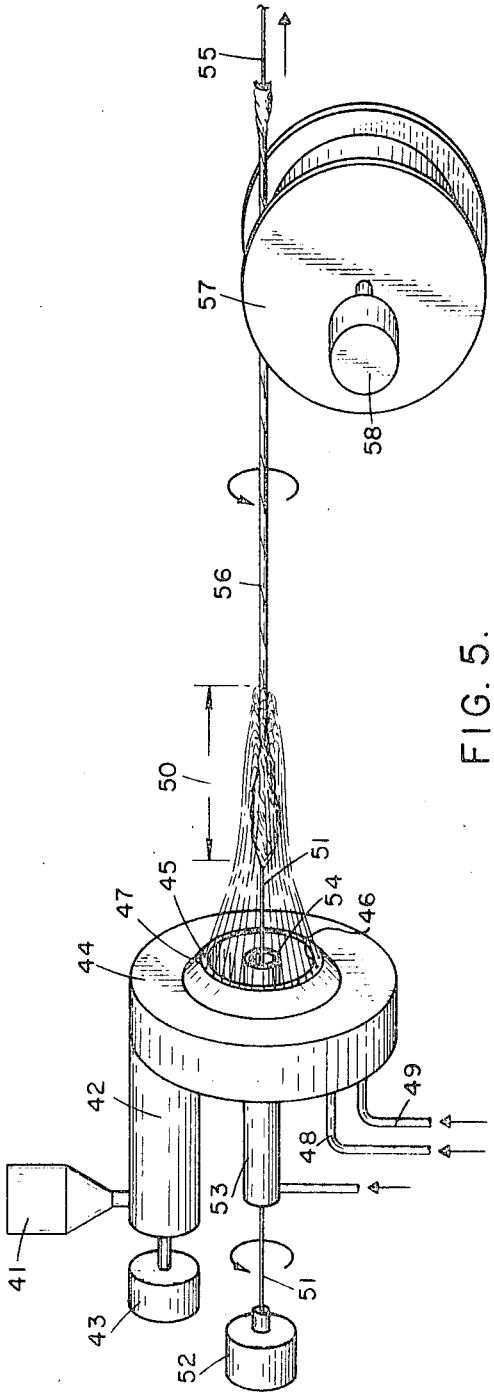

3,615,995

METHOD FOR PRODUCING A MELT BLOWN ROVING

BACKGROUND OF THE INVENTION

Most thermoplastic resins are extruded to form fibers. For example, polypropylene fibers are formed by conventional melt spinning techniques with subsequent drawing, crimping, twisting, texturizing and the like to produce the polypropylene fibers in a final desired form. The purpose of the process of the present invention is to continuously convert thermoplastic resins such as polypropylene into a roving of entangled and self-bonded fine fibers by a melt blown roving technique.

In considering some of the processes of the prior art which disclose the formation of a cylindrical tow of fibers, the following U.S. patents have been considered: U.S. Pat. No. 2,886,877, 3,023,075, and 3,148,101.

SUMMARY OF THE INVENTION

The present invention is directed to the extrusion of thermoplastic resins into a roving of fine fibers by extruding the resin through a die having the die openings arranged in a circle. Gas streams, preferably air, are supplied by gas plenums in the form of slots concentrically inside and outside of the circle of die openings to attenuate the extruded resin into fine fibers. The circle of die openings are preferably arranged in the die so as to extrude and direct the thermoplastic resin as a cone of fibers in space extending from the die openings, the cone being largest at the die and narrowing to an imaginary focal point in front of the die. The shape of the cone of fibers in space may be modified by controlling the relative velocities of the gas streams from the plenums inside and outside the circle of die openings to change the distance of the imaginary focal point of the cone of fibers in front of the die.

The conical profile of the fibers coming from the die openings may be further controlled by means of an auxiliary gas stream supplied through a gas plenum in the form of a jet in the center of the circle of die openings. The auxiliary gas stream assists in cooling the fibers prior to collection and also modifies the laydown of the fibers. Thus, the auxiliary gas stream may be used to change the conical shape of the fibers as they are attenuated from the die so that the profile of the fibers in space becomes more cylindrical at the laydown zone. By thus controlling the auxiliary gas stream, the time-temperature history of the extruded resin may be changed as well as the laydown pattern of the individual fibers.

The fibers may be collected as a roving in a number of distinct ways. The fibers may be collected either by moving the roving of fibers away from the die or through the center of the circle of die openings. The direction of removal of the roving of fibers formed are distinguished by defining forward takeoff as collecting and moving the roving in a direction away from the die and reverse takeoff as collecting and moving the roving of fibers back through the center of the circle of die openings. The direction of collecting and moving the roving results in the production of distinctly different products. For example, in the reverse takeoff a smooth skin of bonded fibers may be produced on the outside of the roving, while on the other hand, forward takeoff produces a softer outer layer of individual fibers and aggregates of fibers on the roving.

A fixed or rotating collecting means may be used in the laydown zone to collect the fine fibers in a desired form. The preferred collecting means is a stabilizer rod. The stabilizer rod is preferably rotated to produce a uniform tow. The rotation of the stabilizer rod produces a permanent twist in the product and eliminates the opening or soft center of the two due to being removed from the stabilizer rod. However, if a hollow tow is desired a large stationary or rotating rod may be used.

Further, the tow of entangled and self-bonded fibers may be modified by using more than one die. Thus, a two may have additional fibers bonded to the outside by passing the tow through one or more dies and using the tow as the collecting means for collecting further fibers in place of the stabilizer rod. The direction of takeoff as the tow passes through the circle of die openings in each die will determine the overall nature of the tow.

BRIEF DESCRIPTION OF THE DRAWINGS

FIG. 2 is a cross-sectional detail of a die with portions cut away;

FIG. 3 is a detail of the inner ring of the die;

FIG. 5 is a schematic view of the melt blown roving process with forward takeoff;

FIG. 6 is a schematic view of the melt blown roving process with a plurality of dies.

DESCRIPTION OF THE PREFERRED EMBODIMENTS

Figure 1:
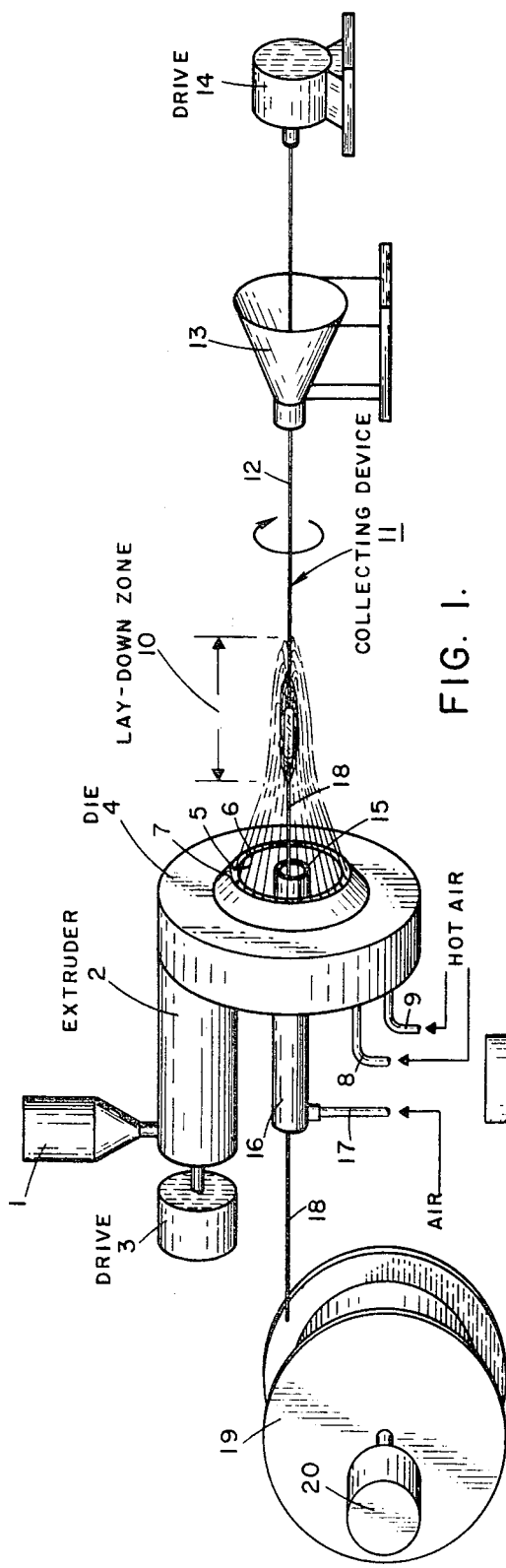
FIG. 1 is a schematic view of the overall melt blown roving process with reverse takeoff.

Referring to FIG. 1 which sets forth one embodiment of the overall melt blown roving process, a thermoplastic such as polypropylene is introduced into the feed hopper 1 of an extruder 2. The thermoplastic is heated in the extruder 2 and is placed under shear by a screw (not shown) in the extruder 2 driven by drive 3. The thermoplastic is extruded from a die 4 which has a plurality of die openings 5 arranged in a circle into a gas stream. The gas stream is supplied by gas plenums 6 and 7 arranged concentrically inside and outside, respectively, to the circle of die openings 5.

The thermoplastic is extruded from the die 4 as continuous fibers which are attenuated by the gas stream from plenums 6 and 7. Gas is supplied to the plenums 6 and 7 by lines 8 and 9, respectively, each of which may be independently controlled as to pressure and temperature (not shown). By the control of the gas stream, the extruded fibers are attenuated from the die openings 5 in the shape of a cone, with the largest portion of the cone being at the die openings 5. The fibers are collected in a laydown zone 10 which is in proximity to the imaginary apex of the cone of attenuated fibers. The distance from the die openings 5 to the laydown zone 10 is controlled to a large extent by the relative gas velocities from plenums 6 and 7.

The attenuated fibers are collected on a collecting device 11 which may have various shapes and sizes. The collecting device 11 is preferably a stabilizer rod 12 which is held stationary or rotated. The stabilizer rod 12 may be placed through the center of a funnel 13 or other means which act as a bearing to stabilize the rod 12 when rotated by a drive means 14. The funnel 13 also protects the drive means 14 from stray fine fibers. As the fibers collect on the stabilizer rod 12, they entangle and become self-bonded.

To modify the configuration of the fibers as they are collected in the laydown zone 10 on the stabilizer rod 12, an auxiliary gas stream may be supplied from a gas plenum 15 formed by a double wall pipe 16. The double wall pipe 16 is positioned along the axis defined by the center axis of the die 4 and the center of the circle of die openings 5. The gas stream from gas plenum 15 is directed at the collecting device 11 or stabilizer rod 12 and the airstream modifies the laydown of the fibers in laydown zone 10 so that they take a more cylindrical shape. Gas, preferably air, is supplied to the double wall pipe 16 by line 17 which may be controlled as to pressure and temperature. The auxiliary gas stream may be used to modify the time-temperature history of the fibers as well as the configuration and entanglement of the fibers. The gas supplied through gas plenum 15 may be cooler or hotter than the air supplied through plenums 6 and 7.

To begin the melt blown roving operation, a starter rod 18 is extended into the laydown zone 10 along the stabilizer rod 12 to draw the fibers as a continuous tow from the stabilizer rod 12 either in a forward takeoff or in a reverse takeoff, the reverse takeoff illustrated in FIG. 1. As shown in FIG. 1, the starter rod 18 is drawn through the center of the double-wall pipe 16 where the tow is attached to a windup reel 19 driven by motor 20.

In FIG. 2 and 3, the details of a die 4 are illustrated which may be used in the present invention. The die 4 comprises a die assembly 21 which provides an inlet from the extruder 2 to an annular polymer distribution chamber 22 and a plurality of passageways to the die openings 5. The die 4 is torusoidal in shape, the term "torusoidal" meaning herein a die assembly of any cross-sectional shape which is rotated around an axis so that the die openings 5 of the die 4 are in a circle with the axis as the center. The die assembly 21 may be comprised of an inner ring member 23 and an outer ring member 24 which meet in a facing 25. A plurality of grooves 26 may be milled in the facing of either the inner ring member 23 or outer ring member 24 or in both facings to provide the passageways from the annular polymer chamber 22 to the die openings 5. An outer coverplate 27 which overlays the outer ring 24 defines the outer gas plenum 7 whose outlet is in the form of a slot concentrically outside the die openings 5. An inner coverplate 28 defines an inner gas plenum 6 whose outlet is in the form of a slot concentrically inside said die openings 5. A thermoplastic polymer is introduced into polymer inlet means 29 and is forced into the annular polymer chamber 22 and extruded through die openings 5. Hot gas, preferably air, is supplied by lines 8 and 9 into gas inlet means 30 and 31 which supply the gas under pressure to outer gas plenum 7 and inner gas plenum 6, respectively.

The shape of the cone of fibers as they are extruded and attenuated from the die openings 5 in the die 4 is controlled by the geometry of the die and by the relative velocities of the gas coming from the gas plenums 6 and 7. The gas plenums 6 and 7 may be built into the die 4 such that the angle alpha ($\alpha$) between the two plenum outlets or slots 32 and 33 is up to 90° but is preferably between 0° to 60°. The plurality of passageways or grooves 26 in the die assembly 21 is at an angle beta ($\beta$) which is smaller than the angle alpha ($\alpha$) and at an angle between that defined by the gas plenums 6 and 7. Preferably the angle beta ($\beta$) is midway between the angle defined by the gas plenums 6 and 7. The geometry of the die is further defined in that the centerline of the die openings 5 or grooves 26 and the axis of the die 4 define an angle delta ($\Delta$) which may vary from 0° to 90° and is preferably 20° to 60°. While the geometry of the die 4 contributes to the shape of the cone of fibers as they leave the die openings 5, this shape may be immediately modified by the relative velocities of gas coming from the gas plenums 6 and 7 such that the angle gamma ($\gamma$) between the fibers leaving the die openings 5 and the axis of the die may be within the range of 0° to 90° and preferably 20° to 60°.

Figure 4:
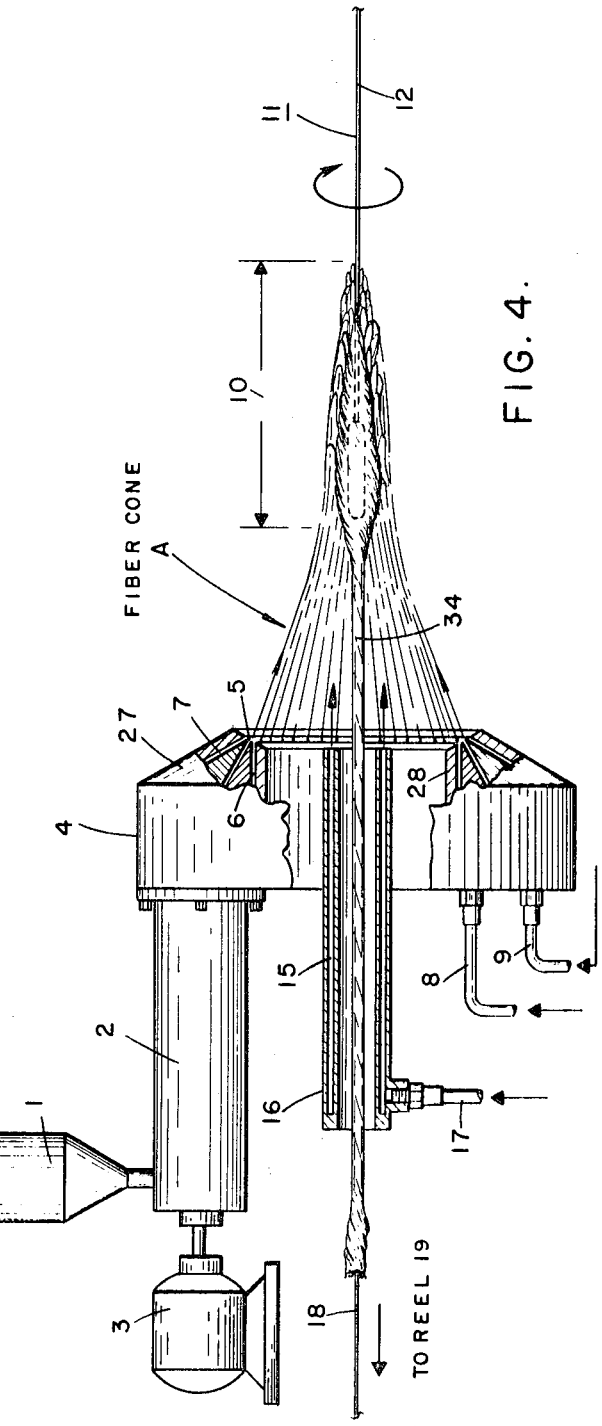
FIG. 4 is an enlarged view of the die to illustrate the collecting or laydown zone.

The collection of the fibers in the laydown zone 10 is more fully illustrated in FIG. 4 of the drawings. The melt blown roving operation of the present invention allows numerous products to be produced by varying the conditions in the laydown zone 10. The fibers are extruded and attenuated from the die openings 5 initially in the form of a cone A. As the fibers converge, the individual fibers come in contact with one another and with the roving previously formed. Being hot the fibers can stick or self-bond and begin to entangle. The fibers, however, continue to attenuate and stick together and to the roving further from the die openings 5 in the laydown zone 10 until a mass of entangled and self-bonded fibers is formed. The laydown zone 10 extends from the point where initial contact of fibers occur to the furthest point away from the die openings 5 where the fibers collect in the fiber mass as a tow. The laydown zone 10 may be several inches to a foot or so from the die openings 5. The laydown zone 10 may be modified by independently varying the angle gamma ($\gamma$) of the extruded thermoplastic, the use of the auxiliary gas stream from plenum 15 and the direction of takeoff. The use of the auxiliary gas stream from plenum 15 in most instances produces a more uniform laydown of the fibers and accordingly a more uniform tow of fibers is produced. When the tow 34 is removed from the laydown zone 10 by a reverse takeoff as illustrated in FIG. 4, the tow may have a bonded and smooth outer surface, whereas when the tow is removed from the laydown zone 10 in a forward takeoff, the outer surface appears more fluffy. A tow may be produced which is less dense and has less self-bonding by having the laydown zone 10 further away from the die openings 5.

Referring to FIG. 5, the melt blown roving technique of the present invention is illustrated with the forward takeoff. The thermoplastic resin is introduced into the feed hopper 41 of an extruder 42. The thermoplastic is heated, placed under shear by a screw in the extruder 42 driven by drive 43 and extruded from die 44 into a gas stream. Die 44 has a plurality of die openings 45 arranged in a circle. The gas stream is supplied by gas plenums 46 and 47 arranged concentrically inside and outside, respectively, to the circle of die openings 45. Heated gas is supplied to the plenums 46 and 47 by lines 48 and 49, respectively, each of which may be independently controlled as to pressure and temperature. The extruded fibers are attenuated from the die openings 45 by the gas stream and collected in a laydown zone 50.

The collecting device preferred in the forward takeoff embodiment is a stabilizer rod 51 which is rotated by drive 52. The stabilizer rod 51 is inserted through the center of a double wall pipe 53 which supplies an auxiliary air stream from the gas plenum 54 which is defined by the double wall pipe 53. To begin the operation, a starter rod 55 is placed in the laydown zone 50 and is drawn away from the die 44 to form a tow 56. A tow 56 is wrapped around a windup reel 57 which is rotated by a motor 58.

In FIG. 6 the melt blown roving technique is illustrated with a plurality of dies. By using two or more dies, tows may be produced having distinct and unusual properties. The thermoplastic resin such as polypropylene may be introduced into hoppers 70, 80 and 90 of extruders 71, 81 and 91, respectively. The resin is extruded out of the dies 72, 82 and 92. As illustrated, the first die 72 utilizes forward takeoff with a stabilizer rod 73 rotated by motor 74. The tow 75 is formed and is passed through the double wall pipe 83 positioned along the axis of die 82. Additional fibers are bonded to the outside of tow 75 to produce a larger tow 84 which may pass through a guard 85. Die 82 is also operated with forward takeoff. The tow 84 is then passed through the double wall pipe 93 positioned along the axis of die 92. The operation of die 92 is with reverse takeoff such that a smooth, bonded skin of fibers is produced on the outer surface of the tow 94. The tow 94 may be wound on a reel (not shown). While the three dies 72, 82 and 92 have been illustrated as two forward takeoff operations followed by a reverse takeoff, it is understood that when more than one die is used the possible combinations increase with the number of dies used.

In the melt blown roving technique other thermoplastic resins may be used besides polypropylene such as the various nylons (6, 66 and 610), polystyrene, polyethylene terephthalate, polymethylmethacrylate, other polyolefins such as polyethylene, ethylene propylene copolymers. By using a partitioned die or when more than one die is used more than one kind of thermoplastic resin may be used in the melt blown roving process of the present invention. Thus, the roving characteristics are subject to modification by using a mixture of thermoplastic resins or a laminated tow may be formed of various resins. Further, additives or binders may be incorporated into the roving by injection into one or more of the air streams. In this manner composite structures can be formed with special, desirable properties such as charcoal-impregnated filter rods.

The present invention will be further described by the following examples which illustrate the present invention but are not to be considered so as to limit the invention.

The following examples illustrate the operation of the melt blown roving technique of the present invention. All samples were made using a 30 melt flow rate polypropylene resin.

EXAMPLE 1

The following rovings or tows were made with reverse takeoff and with the conditions shown in the following table.

| Sample No. | Main Air #/min. | Main Air Temp., °F. | Aux. Air #/min. | Polymer Temp., °F. | Polymer gm/min. | Stabilizer Rod Free end Distance to die, in. | Stabilizer Rod Variac Setting | Stabilizer Rod Shape | Product Denier × 10⁻³ |
|---|---|---|---|---|---|---|---|---|---|
| 16–1 | 1.36 | 665 | .95 | 646 | 11.7 | Na* | Na | 5/16"×1–1/2" | ~70 |
| 17–1 | 1.40 | 657 | .92 | 668 | 11.4 | 8 | 18 | round end 1/4"×6" | 58.0 |
| 18–1 | 1.56 | 670 | 1.25 | 662 | 20.1 | Na | 20 | pointed 1/4"×9" | 53.5 |
| 19–7 | 1.77 | 681 | .75 | 676 | 18.3 | 6 | 21.5 | pointed 1/4"×9" | 55.0 |
| 20–7 | 2.16 | 680 | 1.69 | 672 | 17.4 | 7 | 19 | pointed 1/4"×9" | 55.0 |
| 21–1 | 1.97 | 690 | 1.15 | 687 | 16.9 | 8 | 20 | round end 1/4"×9" round end | 69.0 |

*Na—Not available

When the products were cut into short segments, they gave good even appearance in the center with a slight soft bonded skin. When tested as cigarette filters, they gave total solids removal comparable to or better than a Winston cigarette filter.

EXAMPLE 2

A 73,500-denier roving was made by reverse takeoff with the die at 680° F. and air at 680° F. Main air rate was 1.6 lb./min., the auxiliary air rate was 1.2 lb./min., and the polymer rate was 16.9 g./min. The 1/16-inch diameter stabilizer rod was terminated 8 inches from the die with a 1/4inch by 9 inch pointed blade. The variac was set at 20 for the rotation of the stabilizer rod.

To heat seal the surface, the resulting roving or tow was pulled through a die heated to ≈275° C. at speeds of 1 to 6 ft./min. The die had a short tapered entry with a 9/32-inch channel, 1 inch long, at the exit.

The resulting product was a rigid rod consisting of a fine, ropey, fiber core and a compacted, glazed surface when collected at 6 ft./min. At lower speeds the surface became a solid plastic tube. The rods could be cut cleanly with a razor and gave adequate filtering action.

EXAMPLE 3

Various hollow cylinders of fibrous material were made by proper design of the stabilizer rod. The die and main air were operated at 670° to 680° F. with a polymer flow rate of 12 to 20 g./min. The main and auxiliary air rates were adjusted to give stable performance.

A 3/8- or 1/2-inch-diameter tube was rotated as a stabilizer rod. A large funnel, pointed toward the die, was fixed coaxially on the tube. The system was operated with the funnel 6 to 15 inches from the die and with the tube tip 0 to 12 inches from the die. With the assembly rotated at 50 to 100 r.p.m., a hollow cylinder of fibers was withdrawn through the center of the die continuously.

The products were bulky cylinders five-eighths inch to 1½ inches in diameter with center holes which were roughly circular, three-sixteenths inch to one-half inch in diameter. A fine-fiber skin covered the outside under some operating conditions. The cylinder was resilient after squeezing and fairly rigid along its longitudinal axis. This product may be useful as a cartridge filter (with fused ends for sealing) or as slip on insulation.

EXAMPLE 4

A roving was made, using the forward takeoff process, which was subsequently drawn to yield a twine. The die was operated at 665° F., with the main air at 684° F., and a polymer flow of 11.5 g./min. The stabilizer rod had a 3/8-inch wide by 1 inch long blade at the end and projected about 15 inches in front of the die. With the stabilizer rod rotating at 1,700 r.p.m., a 20,000-denier roving was continuously withdrawn. The roving was subsequently fed at 4 ft./min. and drawn 4/1 in an oven held at 325° F. 0

The product was a fairly stiff, twisted, twinelike material with a tenacity of 1.8 g./denier and an elongation to break of 15 percent.

With a die with 240 die openings on a circle having a diameter of 4 inches, polypropylene could be made into rovings under the following operable ranges:

| | Suitable Operable Range |
|---|---|
| Resin melt flow | 0.6 –40 |
| Die temp. °F. | 600 –700 |
| Air temp. °F. | 600 –750 |
| Polymer rate gms./min. | 8⁺–25⁺ |
| Main air flow rate lb./min. | 0.65 –3.6⁺ |
| Aux. air flow rate lb./min. | –<2⁺ |
| Stabilizer rod | |
| Distance, free end to die, in. | |
| Reverse takeoff | 0 –15 |
| Forward takeoff | 6 –30 |
| RPM | |
| Reverse takeoff | 0 –200 or more |
| Forward takeoff | 0 –1,800 or more |
| Product takeoff speed, ft./min. | 1 –60⁺ |
| + Machine limits | |

In the foregoing table of suitable operable ranges, the numbers set forth are not intended as absolute limits. Some numbers are indicated by the following mark (+) which indicates the limits for the particular machine used in obtaining the number. The other numbers are merely set forth as suitable operating conditions and the exact limits have not been ascertained. Furthermore, the operable range for the operating conditions is expected to change as the size of the die is changed and other equipment is used therewith.

The nature and objects of the present invention having been completely described and illustrated and the best mode thereof set forth, what we wish to claim as new and useful and secure by Letters Patent is:

1. A process for producing a nonwoven roving of thermoplastic polymer which comprises:
    extruding said polymer through a die having a plurality of die openings evenly distributed in a circle,
    passing a stream of gas through each of two gas plenums and discharging concentrically adjacent to and inside and outside the circle of die openings and converging upon a collection device to attenuate said polymer into fibers and transport said fibers onto said collecting device whereby said attenuated fibers may self-bond to form a roving,
    collecting the attenuated fibers on said collecting device to form a roving, and
    continuously withdrawing said roving from said collecting device.

2. A process according to claim 1 wherein said polymer is extruded through said die openings to produce a cone of fibers in space, said cone of fibers being largest at the die openings and converging in space.

3. A process according to claim 2 wherein said converging fibers are collected on said collecting device and withdrawn from said collecting device in a direction away from said die.

4. A process according to claim 2 wherein said converging fibers are collected on said collecting device and withdrawn from said collecting device in a direction toward said die.

5. A process according to claim 1 wherein said polymer is polypropylene.

6. A process according to claim 2 wherein collecting device is a stabilizer rod.

7. A process according to claim 6 wherein said stabilizer rod is rotated.

8. A process according to claim 1 wherein the roving formed in the first die is passed through the center of a second die having die openings in a circle,
   extruding polymer through the die openings of said second die,
   passing a stream of gas through gas plenums concentrically inside and outside the circle of die openings to attenuate the polymer into fibers, and
   collecting the attenuated fibers from said second die on the roving formed in the first die.

9. A process according to claim 8 wherein the direction of takeoff of said first and second dies are the same.

10. A process for producing a self-bonded nonwoven roving of a thermoplastic material which comprises
   establishing a gas transport system consisting of two adjacent gas streams converging upon a terminus area,
   injecting a plurality of streams of thermoplastic material between said gas streams and directed toward said terminus area,
      said gas streams and said thermoplastic material being at temperatures to maintain said thermoplastic material in a condition to permit self-bonding of said material in said terminus area,
      said gas streams being of sufficient velocity to draw said streams of thermoplastic material into filaments and to conduct said filaments in convergence to said terminus area,
   impinging said converging filaments upon a collecting device in said terminus area, whereby said filaments self-bond to produce a roving,
   and continuously withdrawing said roving from said collecting device at a mass rate which is equal to the mass rate at which said thermoplastic material is introduced between said gas streams.

11. A process in accordance with claim 10 wherein the gas streams form a conical transport zone and the collecting device is located substantially at the apex of said conical transport zone.

12. A process in accordance with claim 11 wherein the roving is removed from said collecting device along a path which is along the axis of said conical transport zone and in a direction which is toward the source of said gas streams.

13. A process in accordance with claim 12 further comprising the step of directing a cylindrical stream of gas along the axis of said conical transport zone toward said collecting device and in a direction opposite to the direction of withdrawal of said roving.

* * * * *